Aug. 10, 1965
W. B. SHARAV ETAL
3,200,016
SUBMERGED-MELT WELDING COMPOSITION
Filed Jan. 22, 1964
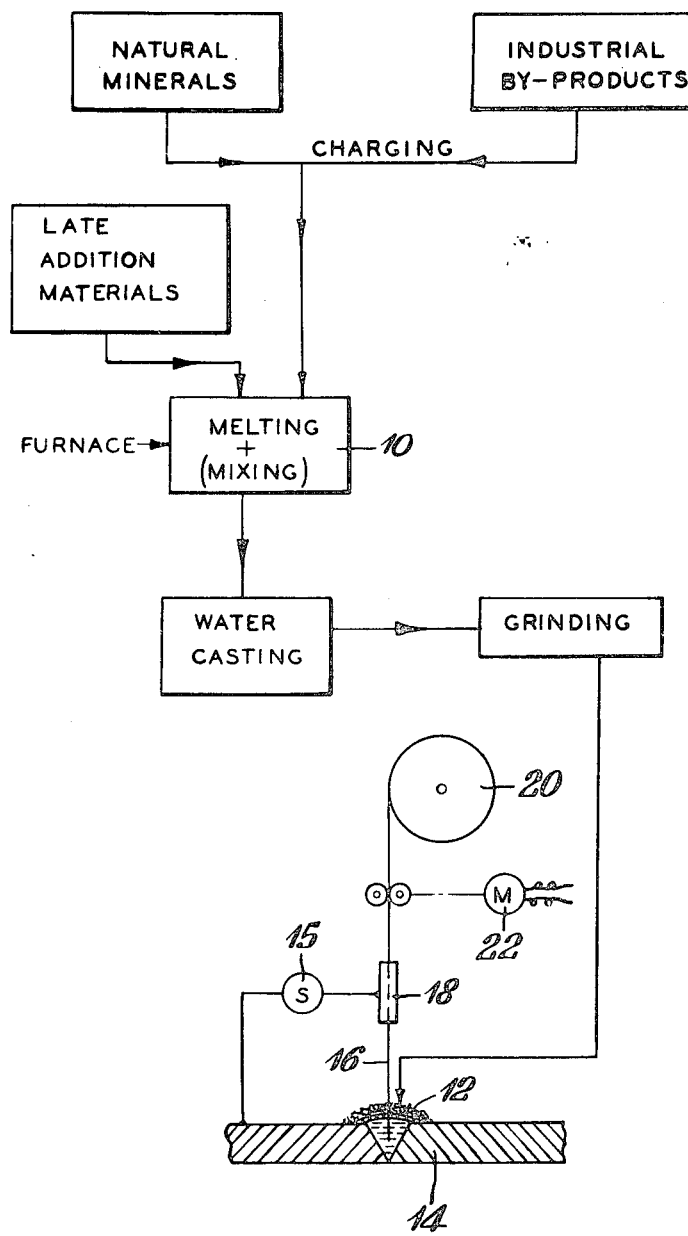
INVENTORS
WILLIAM B. SHARAV
KENNETH W. RIMER
THOMAS L. COLESS
BY Barnwell P. King
ATTORNEY

3,200,016
SUBMERGED-MELT WELDING COMPOSITION
William B. Sharav, Short Hills, Kenneth W. Rimer, Newark, and Thomas L. Coless, Maplewood, N.J., assignors to Union Carbide Corporation, a corporation of New York
Filed Jan. 22, 1964, Ser. No. 339,523
5 Claims. (Cl. 148—26)

This application is a continuation-in-part of our application Serial No. 225,806, filed September 24, 1962, now abandoned, for Submerged-Melt Welding Composition.

This invention relates to work-in-circuit electric arc welding of the type described in Patent No. 2,043,960, issued to Jones, Kennedy and Rotermund, and more particularly to flux composition for use therein.

Electric welding processes of this type are characterized by the use of a deep layer or blanket of comminuted flux material which covers the welding zone on the workpiece and in which the end of a consumable welding electrode is continuously submerged. A relatively heavy electric current is passed through the electrode, blanket, and workpiece to melt successive portions thereof, to deposit molten electrode metal on the metal of the workpiece, and to maintain a subsurface pool of molten composition above the molten metal.

For submerged arc welding of mild and low alloy steels, numerous compositions of both the bonded and the prefused types have long been in use which produce welds of satisfactory quality. However, industry is constantly seeking new compositions which produce welds of good quality but which are cheaper in cost. The cost of a welding composition might be reduced by the use of cheaper raw materials from which the composition is made. For example, if a composition could be made from materials existing in their natural state with no refining necessary before their introduction into the composition, then manufacturing costs might be minimized.

In the past this has been thought to be impossible because most prior commercial arc welding compositions consisted essentially of metal oxides, silicates, and a deoxidizing material and such materials do not generally occur in natural form ready for direct use, but must be refined from metal ores, and their impurities removed, before they can be combined to produce a welding composition.

The primary object of this invention is to provide a low-cost composition for submerged arc welding of mild steels and low alloy stels composed essentially of inexpensive materials.

Another object of this invention is to provide a way of making relatively inexpensive submerged-melt welding composition capable of producing high quality welds in ferrous alloys, which involves the use of naturally occurring materials in combination with industrial waste materials.

Other objects and advantages of the present invention will become apparent in the following discussion and description.

The invention provides a submerged arc welding composition that is made essentially of materials occurring in their natural state in combination with certain industrial waste materials. The raw material constituting the composition of the present invention includes the natural minerals, talc and dry silica sand; and the industrial byproducts, ferromanganese slag and ferrovanadium slag. The materials are mixed in an electric furnace where they are fused. However, a composition made from these constituents alone does not provide a composition which is useful for welding since it would have oxidizing properties. Such a composition would have an adverse effect on the metallurgy of the weld and would produce porosity and other undesirable defects as well. In order to produce a composition from these materials which is satisfactory for welding, it is necessary to add to the melt a deoxidizing material.

In application, U.S. Serial No. 835,881, Submerged Melt Arc Welding, Composition and Process, by W. B. Sharav, T. L. Coless, and L. A. Prince, filed August 25, 1959, now Patent No. 3,076,735 dated February 5, 1963, a method is described for adding prefused metallic deoxidizing material to a submerged arc welding composition. As taught in such application, a *prefused* metallic deoxidizer is added as a late furnace addition to the melt and as a result, it dispersed in fine particles of metal uniformly distributed as a "mist" throughout the composition.

We have found that a late furnace addition to the melt, consisting of an *unfused* mixture of calcium fluoride and 85 percent ferrosilicon, serves to fully deoxide the composition, leaving residual deoxidizing metal "mist" in the solidified composition to serve as a deoxidizer when the composition is subsequently used in welding. Other metallic deoxidizers such as ferromanganese and silicon metal could be used as a substitute for the ferrosilicon without altering the basic precepts of this invention. A typical furnace charge for the composition of the present invention is as follows:

| Constituent: | Percent |
|---|---|
| Eastern talc ($MgO \cdot SiO_2$) | 50.0 |
| Dry silica sand ($SiO_2$) | 15.0 |
| Ferromanganese slag ($Al_2O_3 \cdot MnO \cdot SiO_2$) | 21.8 |
| Ferrovanadium slag ($MgO \cdot Al_2O_3$) | 7.7 |
| Calcium flouride ($CaF_2$) | [1] 3.4 |
| Ferrosilicon (85 percent grade) | [1] 2.1 |

[1] Late addition.

The single figure of the accompanying drawing is a flow diagram illustrating the invention.

To prepare the composition of the present invention, the main charge consisting of talc, dry silica sand, ferromanganese slag, and ferrovanadium slag are fused in an electric furnace 10 at from 2300° F. to 3000° F. When the charge is completely melted, the calcium fluoride and ferrosilicon are added in the furnace. The best process results are obtained when FeSi and $CaF_2$ are added together as a late furnace addition. The addition to these materials tends to lower the temperature of the melt to about 2250° F. to 2750° F. As soon as the late addition is adequately mixed throughout the melt, the melt is water cast. It is then later ground to the appropriate size for the welding composition 12.

Such composition is disposed in and on the joint to be welded in work 14. Such work is connected to a welding current source 15 which is, in turn, connected to a metal electrode 16 through a rod or wire guide-contact 18. Electrode 16 is drawn from a reel 20 and fed toward the weld by a feed motor 22.

In manufacturing production lots of the composition some difficulty was experienced in obtaining satisfactory mixing of the late addition of calcium fluoride and ferrosilicon. As a result, the metal mist was not always uniformly distributed throughout the composition. Thus, weld results frequently were erratic. The size and configuration of the particular furnace used made stirring of the melt after adding the late addition impractical, and another means was sought to effect mixing of the melt.

We have found that satisfactory mixing of the melt can be accomplished by omitting a small portion, approximately 4 percent of the talc from the initial charge, and adding it late along with the ferrosilicon and calcium fluoride. The particular grade of talc used consists essentially of $MgO \cdot SiO_2 \cdot CO_2$. When introduced in the furnace the $CO_2$ is driven off. The evolution of gaseous $CO_2$ from that portion of the talc in the late furnace addition provides sufficient agitation of the melt to adequately distribute the metal deoxidizer throughout the composition. When effecting mixing of the ferrosilicon and calcium fluoride in this manner, the talc used with the late addition must be of a type that is gas evolving. However, where the furnace permits mechanical stirring of the melt, all of the talc may be included in the initial charge, and the talc may be of a grade that is not gas evolving.

The addition of the calcium fluoride with the metallic deoxidizing material as a late furnace addition serves several purposes. First, the calcium fluoride, which has a comparatively low melting point, fuses and forms a protective coating over the particles of the metallic deoxidizer, protecting them so that they do not melt and agglomerate in the melt. In addition, the relatively low melting point of the calcium fluoride lowers the melting point of the melt so that when the composition is used in making a weld, the flux is more fluid, thus producing a smoother surface on the weld deposit and improving coalescence with the base material. It is necessary, however, that the calcium fluoride and metallic deoxidizer be added as a late addition to the furnace so that the volatile fluoride is not lost from the composition. We have found that the best results are achieved when the melt is water cast as soon as practicable after adding the calcium fluoride and metallic deoxidizing material.

When the constituents are mixed and fused in an electric furnace in the proportions listed in the above table, water cast, and ground to an appropriate sizing, a submerged arc welding composition containing metal mist deoxidizers is produced. A chemical analysis of the composition of the present invention is listed in the table below:

*Chemical analysis*

|  | Percent |
|---|---|
| MnO | 9–12 |
| $Al_2O_3$ | 6–10 |
| MgO | 20–24 |
| $SiO_2$ | 46–54 |
| $CaF_2$ | 3– 5 |
| Fe-Si | [1] 0.7–2.0 |
| $Na_2SiO_3$ | [2] 0.5 Max. |

[1] Silicon metal mist
[2] Anhydrous

This composition, with constituents in the ranges listed above, has been found generally satisfactory for use in submerged arc welding of mild steel and low alloy steels. Weld tests have been conducted to compare the performance of the composition of the present invention with a commercial bonded composition that is intended for the same general purpose. The tests indicated that the invention composition produces a freer peeling melt and a weld surface completely free of fused melt particles. The commercial bonded counter-part of the composition of the present invention, on the other hand, frequently leaves fused melt shards along the edges of the weld.

Furthermore, the inventive composition will produce sound welds over rust where the bonded commercial composition, in many cases, produces porosity. The improved performance of the inventive composition is believed due largely to its high silica content and the inclusion of metal mist.

The flux of the invention also appears able to handle higher welding currents than competitive compositions. At a welding current of 1300 amperes, 30 volts A.C., using parallel 5/32 in. diameter welding wires, the inventive composition produced excellent flat fillet welds on mild steel plate, whereas the competitive compositions produced welds that were rough and peaked and the slag was not free peeling. In general, the composition of the invention produces welds having fewer undercuts, pinches along the weld edge, a smoother surface, and fewer gas pores in comparison to those produced by the bonded commercial composition. In addition, its chief advantage over prior art compositions of the prefused type lies in the fact that it is comparatively much less expensive to manufacture.

The subject invention produces a uniform distribution of FeSi particles, smaller in size than those of the original addition, which are surrounded by and cemented to the fused composition, and therefore are inseparable from it.

Sharav et al. patent teaches that small FeSi particles can be dispersed or suspended in a fused composition by adding powdered metallic FeSi as a late furnace addition just before pouring the latter, and pouring the molten composition containing such particles before the particles agglomerate. Rapid pouring is stressed to prevent agglomeration. Best results were achieved when the FeSi was *prefused* with $CaF_2$. Simple additions of metallic FeSi to the molten composition produced larger less effective suspended particles in the fused composition, and holding intervals between melting and casting caused rapid agglomeration of the suspended particles. Since it is always difficult to chill-cast molten compositions rapidly, simple additions of FeSi to molten compositions were not entirely practical commercially. *Prefusing*, while more practical, added to the cost.

The present invention makes it possible to obtain a very fine, stable dispersion of the FeSi (the finer the particles, the less likely they are to agglomerate) when it is added as a *mixture of powdered $CaF_2$ and 85 percent grade FeSi (85 percent Si)*. Further improvements in dispersion and fineness are achieved by mixing magnesium carbonate (talc) with this additive mixture.

Such results were unexpected and were discovered quite accidentally when the latter additive (talc) was added to agitate the bath and the FeSi, since the latter tends to float on the composition when it only is added to the molten bath. It is now believed that the active agitation produced by the addition of powdered $CaF_2$ and magnesium carbonate is responsible for the fine dispersion. Adding prefused lump $CaF_2$ containing FeSi particles is not as effective, since active agitation is absent.

It must also be noted that the new composition is *not* disclosed in the Sharav et al. patent. The modified calcium silicate disclosed in such patent is quite unlike the new composition, because of the relatively high CaO content of the composition of the patent. The modified calcium silicate type described in the patent provides acceptable operating characteristics without FeSi additions; but the specific magnesium alumino silicate of the invention will *not* operate satisfactorily without FeSi additions.

To summarize, the subject invention involves a specific novel composition having well defined chemistry limits which requires for adequate performance the addition of FeSi. This latter addition is made in an efficient novel manner, i.e. adding a mixture of powdered $CaF_2$ and FeSi with or without magnesium carbonate. This produces a finer more effective dispersion compared to simple mechanical additions of FeSi, or additions of *prefused* $CaF_2$ and FeSi. Lower costs are achieved, because it is *not* necessary to prefuse the FeSi, and holding times between melting and casting of the composition can be extended to a more practical level since, the finer dispersion resists agglomeration. Large particles of FeSi are *not* as effective as fine particles in improving melt performance.

What is claimed is:

1. Fused flux composition for welding mild and low alloy steels by the submerged-melt welding process, which composition is composed by chemical analysis of

| Ingredient: | Percent |
|---|---|
| MnO | 9–12 |
| $Al_2O_3$ | 6–10 |
| MgO | 20–24 |
| $SiO_2$ | 46–54 |
| $CaF_2$ | 3–5 |
| Fe-Si | 0.7–2.0 |
| $Na_2SiO_3$ | 0.5 max. | such composition being made directly from unrefined and industrial waste material in combination with a late furnace addition composed of an unfused mixture of powdered FeSi and $CaF_2$ to provide a metal deoxidizer.

2. Fused flux composition as defined by claim 1, in which such unrefined materials include the natural minerals: talc and dry silica sand; the industrial waste materials include the furnace by-products: ferromanganese slag and ferrovanadium slag; and the late furnace addition consists of an unfused powdered mixture of calcium fluoride and ferrosilicon.

3. In the art of making fused flux compositions for the submerged-melt welding of mild and low alloy steels, the process which comprises directly charging a melting furnace with cheap raw materials consisting of natural minerals and industrial by-products, melting such charge, adding thereto as a late addition, a metal deoxidizer composed of an unfused mixture of powdered $CaF_2$ and FeSi, agitating the resulting melt, then water casting and grinding the product in each grain of which minute particles of ferrosilicon and distributed, such furnace charge being composed of

| Constituent: | Percent |
|---|---|
| Eastern talc ($MgO \cdot SiO_2$) | 50.0 |
| Dry silica sand ($SiO_2$) | 15.0 |
| Ferromanganese slag ($Al_2O_3 \cdot MnO \cdot SiO_2$) | 21.8 |
| Ferrovanadium slag ($MgO \cdot Al_2O_3$) | 7.7 |
| And such late addition is composed of an unfused powdered mixture of | |
| Calcium fluoride ($CaF_2$) | 3.4 |
| Ferrosilicon (85 percent grade) | 2.1 |

4. In the art of making fused flux composition as defined by claim 3, in which such mixing is accomplished by omitting about 4 percent of the talc from the initial charge and adding an equivalent amount of $CO_2$ gas evolving talc late along with the ferrosilicon and calcium fluoride, so that gaseous $CO_2$ is evolved thereby agitating the melt.

5. Process of making submerged-melt welding composition, which comprises charging a melting furnace directly with:

| Constituent: | Percent |
|---|---|
| Eastern talc ($MgO \cdot SiO_2$) | 50.0 |
| Dry silica sand ($SiO_2$) | 15.0 |
| Ferromanganese slag ($Al_2O_3 \cdot MnO \cdot SiO_2$) | 21.8 |
| Ferrovanadium slag ($MgO \cdot Al_2O_3$) | 7.7 |
| Melting such charge and then adding as a late addition an unfused powdered mixture of | |
| Calcium fluoride ($CaF_2$) | 3.4 |
| Ferrosilicon (85 percent grade) | 2.1 | and agitating such melt to distribute minute ferrosilicon particles therein, then water casting and grinding the product which by chemical analysis is composed of

| Ingredient: | Percent |
|---|---|
| MnO | 9–12 |
| $Al_2O_3$ | 6–10 |
| MgO | 20–24 |
| $SiO_2$ | 46–54 |
| $CaF_2$ | 3–5 |
| Fe-Si | 0.7–2.0 |
| $Na_2SiO_2$ | 0.5 | in which each grain contains minute particles of Fe-Si therein.

References Cited by the Examiner

UNITED STATES PATENTS 2,043,960 6/36 Jones et al. _____ 148—26
3,076,735 2/63 Sharav et al. _____ 148—26

DAVID L. RECK, *Primary Examiner.*

WINSTON A. DOUGLAS, *Examiner.*